Patented July 16, 1935

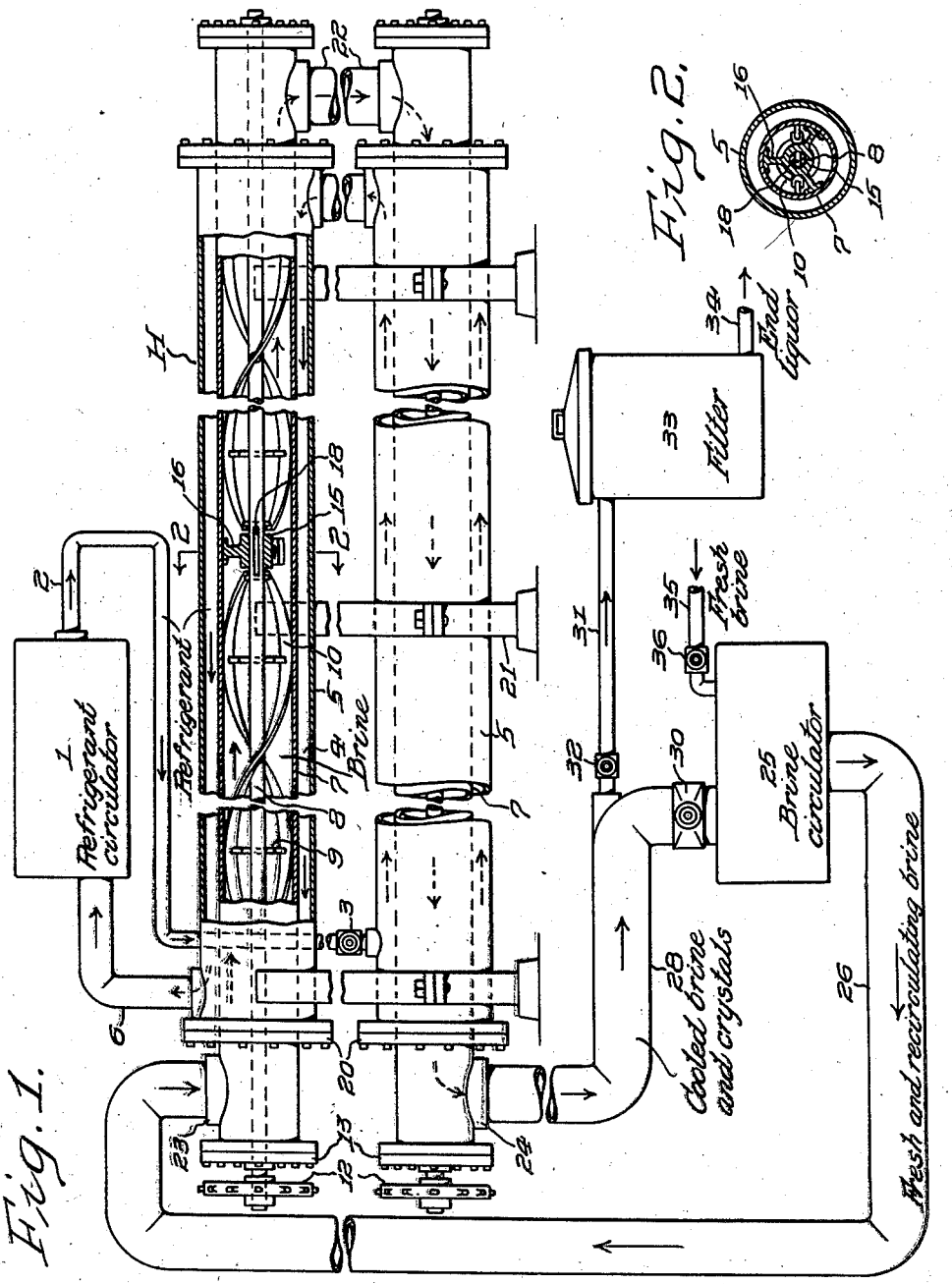

2,007,956

UNITED STATES PATENT OFFICE 2,007,956

METHOD OF RECOVERING CRYSTALLINE SALTS FROM SOLUTIONS

Sidney H. Davis and Carl O. Anderson, Baxter Springs, Kans., and Rudolph J. Stengl, Monahans, Tex., assignors to Ozark Chemical Company, Tulsa, Okla., a corporation of Delaware Application September 9, 1932, Serial No. 632,372

2 Claims. (Cl. 23—121)

This invention relates to the recovery of hydrous sodium sulphate, commonly known as Glauber's salt, or other water-soluble salts in a crystalline state from solutions thereof and is particularly directed to an improved method of and apparatus for removing Glauber's salt from natural brines or other solutions of relatively high concentration.

Our invention have been found especially desirable for use in recoving Glauber's salt from the natural brines found in large quantities in certain parts of the United States and elsewhere in salt lakes and/or in underground pools, although of course, it will be understood that the specific source of brine or other solution of the material to be recovered does not substantially affect the performance of the method of our invention or necessitate any material change in the apparatus which we have devised and which is particularly adapted for the efficient practice thereof.

As is well known, salts and other minerals dissolved in water may be recovered, when the solution is a saturated one, by cooling the solution and thereafter removing the resultant precipitated solids, a conspicuous example of this phenomenon being visible on the shores of the Great Salt Lake during the winter, at which time deposits of Glauber's salt which have been crystallized from the brine of the lake due to the lowering of its temperature may be readily observed.

The cooling of this and similar brines on a commercial scale for the recovery of Glauber's salt or other dissolved substances, has heretofore presented many difficulties arising from, among other things, the tendency of the salt upon crystallization to adhere tenaciously to the walls of the vessel in which it is contained and to the cooling surfaces through which heat transfer is effected in lowering the temperature of the brine; as the insulating properties of such a coating are relatively great, it has consequently been necessary for economic operation to provide additional means for scraping the coating from these surfaces in order to obtain a satisfatory rate of heat transfer; moreover, when circulating chillers have been employed, difficulty has been encountered through the choking of the apparatus from accumulation therein of solidified material requiring dismantling of the apparatus from time to time to permit its removal.

Efforts have also been made to recover Glauber's salt from its solutions by vaporization of the contained water under reduced pressures, the vaporization of the water having the effect both of increasing the concentration of the solution and of reducing its temperature, but the expense of maintaining the low pressures required, for example, 6 millimeters of mercury, is too great in proportion to the value of the amount of salt recovered for this method to be economically efficient.

A principal object of our invention, therefore, is to provide a novel continuous method of recovering dissolved salts, particularly Glauber's salt, from solutions thereof by crystallization under the influence of reduced temperature.

Another object of our invention is to provide a continuous or cyclic method of cooling such a solution, in accordance with which a relatively high rate of heat transfer may be effected and the temperature of the solution therefore reduced to the desired extent in a relatively short time, whereby excessive adherence of the solidified material to the cooling surfaces is inhibited.

A further object of the invention is to provide a method of recovering Glauber's salt from the natural brine in which it is dissolved, by cooling the brine while subjecting it to relatively rapid movement for a sufficient period of time to permit the growth of crystals to a size desirable for commercial purposes although substantially preventing the adherence of crystalline deposits of the salt to the walls of the apparatus in which the brine is contained.

Other objects, advantages and novel features of the method and of the apparatus of our invention will hereinafter more fully appear or be understood from the following description of one manner of performing the said method by the aid of the said apparatus during which reference will be had to the accompanying drawing, showing, in Fig. 1, a diagrammatic representation of the latter, and in Fig. 2 a transverse section thereof on the line 2—2 in Fig. 1, like characters being used to designate the same parts in both figures.

The several elements of the apparatus may be of any desired character adapted for the performance of their respective functions, their specific form being but a matter of choice and constituting no part of the invention. We have therefore diagrammatically indicated in Fig. 1, apparatus which we have found convenient and well adapted to the purposes of the invention, said apparatus comprising means providing a counterflow of fluids through concentric pipes or tubes forming two separate closed circuits, each carrying a different medium, heat exchange between the respective fluids in the circuits being effected where counterflow along concentric paths takes place; these two circuits are hereinafter separately described with greater particularity.

As a cooling medium we prefer to use ammonia in accordance with usual practice in refrigerating and like operations and the refrigerating unit 1 therefore includes an ammonia compressor (not shown) together with a condenser and receiver or storage tank in which the ammonia liquefied in the condenser is maintained under relatively high pressure, an outlet pipe 2 conveying the ammonia from the receiver to a heat exchange unit, generally designated H, into which it is admitted through an expansion valve 3. The space into which the stream of ammonia passing through the expansion valve 3 is thus released includes interconnected elongated cylindrical passageways 4 extending through outer casings 5 of the heat exchange unit. This space is maintained under relatively low pressure due to the suction of the ammonia compressor in the unit 1 which continually withdraws gaseous ammonia therefrom through an intake pipe 6, the expansion of the liquid ammonia and its resultant gasification absorbing relatively large amounts of heat from its confining surfaces. The outer casings 5 may desirably be insulated to prevent too great absorption of heat from the atmosphere and a maximum amount of heat is therefore absorbed from the walls of inner casings 7 extending coaxially within the outer casings 5. While we have shown in the drawing only a single pair of these composite heat exchange tubes, a complete unit desirably includes a plurality of them interconnected for continuous flow of the ammonia through the passages 4 between the inner and outer casings, and from one such passage to an adjacent one, and may be of any desired length. A unit which we have found very practical for the purposes of our invention consists of twelve of these double casings, each about 40' long, arranged in parallel, spaced relation, the outer casings 5 being desirably about 8" in diameter and the inner casings 7 about 6" in diameter. In normal use of the apparatus the refrigerating unit is desirably operated to effect continuous flow of ammonia through the circuit described and consequent continuous absorption of heat from the walls of the inner casings 7 throughout the heat exchange unit.

For facilitating a suitable flow through the heat exchange unit of the brine or other solution which is to be cooled, a conveyor of any suitable type may desirably be employed. However, we preferably provide within each inner casing 7 a ribbon conveyor of the character indicated in the drawing comprising a shaft 8 extending longitudinally of the casing and having secured thereto from suitable supports 9 a pair of oppositely disposed spiral metal strips or ribbons 10 so arranged as to scrape the walls of the casing when the shaft is rotated. A sprocket 12 is secured to one end of each shaft externally of the gland heads 13 of the casing which provide end bearings for the shaft, the sprockets on all of the shafts being desirably arranged in vertical alignment to permit a driving chain or link belt (not shown) to be carried thereover, to enable all the sprockets to be driven from a common actuating means. The ribbons 10 may be interrupted at longitudinal intervals of about 10 to 12 feet to provide spaces for supporting bearings 15 having spider legs 16 contacting the walls of the inner casings. Bearings of this character are particularly desirable in that minimum obstruction is offered to the passage of brine through the casings 7 and the accumulation of excessive deposits of salt in the vicinity of the bearings is thereby prevented, the free flow of the brine being also enhanced to some extent, if desired, by the provision of a longitudinal slot 18 in the shaft 8 adjacent each bearing, through which a portion of the brine may flow from one side of the bearing to the other.

The outer casings 5 are provided with heads 20 which may be of any desired character adequate to maintain tight joints with and permit the inner casings 7 to project through and beyond them, the ends of the casings 7 being closed by gland heads 13 which also provide bearing support for the ends of the shafts 8 as described. The several outer casings of the heat exchange unit may be supported on racks 21 or in any other suitable manner in accordance with usual practices.

The inner casings 7 throughout the heat exchange unit are desirably so interconnected, as by cross-over connections 22, that a continuous flow of brine from a brine inlet port 23 through the unit to a brine outlet port 24 is permitted and, as shown by arrows in the drawing, the direction of this flow through the several pipes and through the unit as a whole is desirably counter to the direction of flow of the refrigerating ammonia through the exterior casings so that the brine is subjected to the lowest temperature just prior to leaving the heat exchange unit, since the liquid ammonia admitted through the expansion valve 3 exerts its greatest heat absorbing effect adjacent its point of admission to the relatively low pressure zone in the passages 4 within the outer casings 5.

The apparatus employed for circulating the brine through the brine circuit, including the inner casings 7, may be of any desired specific character and therefore requires no extended description. It preferably comprises, however, a suitable pump 25, the exhaust port of which is connected through piping 26 to the brine inlet port 23 of the heat exchange unit, the intake port of the pump 25 being interconnected through a pipe 28 with the brine outlet port 24 of the heat exchange unit so that, as described, the operation of the pump induces a continuous circulation of the brine from the pump through the inner casings 7 of the heat exchange unit and back to the pump, and we prefer to provide adjacent the intake port of the pump 25, a valve 30 which may be utilized to control the amount of brine drawn by the pump from the heat exchange unit. Between the valve 30 and the outlet port of the heat exchange unit a pipe 31 is connected into the pipe 28 and controlled by a valve 32, this pipe being adapted to conduct a portion of the cooled brine returning from the heat exchange unit to a filter 33 of any convenient character, in which the entrained crystallized salt is removed, the waste fluid filtrate being discharged through a pipe 34 and disposed of in any convenient way. A pipe 35, interconnected with a source of fresh brine, carries the latter to the intake port of the pump 25 and is controlled by a valve 36, so that the pump may draw solution both from the cooled brine return pipe 28 and from the fresh brine inlet pipe 35 in proportions depending upon the adjustment of the respective valves.

In the performance of our method with the aid of apparatus of the general character just described, the refrigerating unit is started up and the brine circuit filled with brine, drawn from the source of supply through the pipe 35, by means of the pump 25. After the circuit is so filled, the pump is kept in operation in such manner as to force the brine through the circuit at, preferably, a relatively high velocity, for example about 100' per minute; the heat carried by the brine is therefore absorbed by the refrigerant resulting in a lowering of the temperature of the brine. After the latter has been cooled sufficiently, say to 35° to 40° F., to bring about considerable crystallization, we then withdraw through the pipe 31 a portion of the cooled brine, preferably about one-fifth of it, and introduce it to the filter 33 in which the entrained crystallized salt is removed. The remainder of the stream of chilled brine, supplemented by the addition of a continuous stream of fresh unchilled brine drawn from the pipe 35, in an amount substantially equivalent to that withdrawn for filtration, is then again pumped through the heat exchange unit for further recirculation and cooling therein. Thus once the cycle is established, it may be carried on continuously for any desired period, fresh uncooled brine being constantly supplied to replace the chilled brine delivered to the filter. Of course during these operations, the conveyors within the brine pipes 7 are preferably continuously operated to assist in maintaining the walls of the pipes free of precipitated salt.

The fresh brine admitted to the system after initiation of cyclic or continuous operation is generally at about atmospheric temperature, but as it is immediately mixed with a relatively large volume of cooler brine, its temperature is substantially lowered almost immediately with the result that a satisfactory rate of heat exchange to further reduce the temperature of the mixture may be subsequently effected even when the brine passes through the heat exchange unit at a relatively high velocity, which is desirable in that it tends to minimize adherence of salt to the cooling surfaces; the rapid cooling of the fresh brine as it mixes with the brine in the system also assists in this regard. Furthermore, since we preferably recirculate a relatively large portion of the brine, substantially every molecule thereof passes through the heat exchange unit on an average of four or five times and is thus subjected to a low temperature for a relatively long period, even though each circuit, because of the rapid movement of the brine, is of comparatively short duration, and the crystals of Glauber's salt thus grow to a considerable size before the solution in which they are entrained is withdrawn for filtration. Consequently the crystals may be readily filtered from the solution and are delivered from the filter in a form suitable for commercial purposes without further treatment.

Although the high velocity of the brine usually maintains substantially all the solidified salt in suspension therein, it is generally desirable to employ the ribbon conveyors to which we have referred since they are effective to continuously remove crystals which may adhere to the walls of the pipes in the areas in which they contact therewith so that the possibility of the deposition of an insulating layer of salt on the cooling surfaces of the pipes is prevented and the maximum amount of heat transfer through the latter is obtained. In some instances, however, difficulty may be encountered through deposition of the salt in the ends of the inner casings 7 or in the cross-over or header connections 22 since the latter are not continuously scraped by the conveyors but such deposits are of a relatively frangible nature and may readily be broken up by externally tapping the pipes with a hammer or the like and when thus broken up become entrained in the brine solution and are carried away. If desired, pressure gages may be inserted in the pipes in the vicinity of the points where such accumulation of deposits is likely to occur and so arranged that an increase in indicated pressure will result from material obstruction of the flow of the brine by a deposit in the pipe adjacent the gage, so that the operator may readily determine where and when a tapping of the pipe is required to remove the obstructions, or, if preferred, the gages may be interconnected with mechanical devices for tapping the pipes when the pressure becomes excessive. As this apparatus forms no part of the present invention it has not been shown or particularly described and is merely referred to as a suggestion of means whereby a difficulty which may be encountered can readily be overcome.

The temperature of the incoming brine may and usually does vary somewhat according to the season when it is obtained from underground pools, salt lakes, or the like, and in the case of most natural brines containing Glauber's salt in solution crystallization on cooling usually begins at between 60° and 50° F., additional salt being crystallized out as the temperature is further lowered. Under most circumstances we have found that most economical recovery of Glauber's salt can be effected by chilling the brine to about 40° F. to 35° F. irrespective of its initial temperature. Although additional salt can be obtained by lowering the temperature below 35°, in ordinary practice we consider this increment insufficient in quantity to justify the additional expense entailed in its recovery. If desired, however, a higher temperature than 40° F. may be utilized since Glauber's salt can be crystallized from a saturated solution by cooling it to any temperature below that at which the salt dissolves in its water of crystallization, namely, 93° F.

While we have herein described our invention with considerable particularity, and have made specific reference to one form of apparatus comprehended thereby and which we prefer to use in recovering Glauber's salt from natural brines in accordance with our method, it will be understood that the latter may be employed for the recovery of other substances from their solutions and that changes and modifications in its several steps and/or in the specific form and arrangement of the apparatus will readily occur to those skilled in the art and may be made, if desired, without departing from the spirit or scope of the invention as defined in the appended claims.

Having thus described our invention, we claim and desire to protect by Letters Patent of the United States:

1. The method of obtaining a commercially useful recovery of crystalline Glauber's salt from an aqueous solution thereof, which consists in continuously mechanically circulating the solution in a stream of considerable volume in a cyclic path, mechanically circulating a coolant in the opposite direction in heat-transferring relation to the vessel defining said path to thereby extract sufficient heat from the solution to induce crystallization of the salt therein, maintaining the crystals in suspension in the moving stream until they attain appreciable size while continuing the heat extraction from the solution and mechanically freeing the inner walls of the vessel from material accumulations of the crystals, then progressively withdrawing a relatively small portion of the crystal-bearing solution from the vessel preparatory to separating the crystals therefrom and adding to the remainder of the circulating stream fresh uncooled solution in an equivalent amount.

2. The method of obtaining a commercially useful recovery of crystalline Glauber's salt from an aqueous solution thereof, which comprises the steps of continuously circulating the solution in a stream of considerable volume within a closed vessel, progressively lowering the temperature of the solution to thereby induce material crystallization of the salt in the moving stream while mechanically agitating the crystal-bearing solution and freeing the walls of the vessel from substantial accumulations of the crystals until the crystals in suspension in the stream attain appreciable size, then progressively diverting a relatively small portion of the crystal-bearing solution from the vessel preparatory to removing its crystalline content and progressively adding to the moving stream in the vessel an equivalent amount of fresh uncooled solution.

SIDNEY H. DAVIS.
CARL O. ANDERSON.
RUDOLPH J. STENGL.